April 19, 1960 J. W. TOMKINS 2,933,332
TRAILER HITCHES
Filed Dec. 3, 1956 2 Sheets-Sheet 1
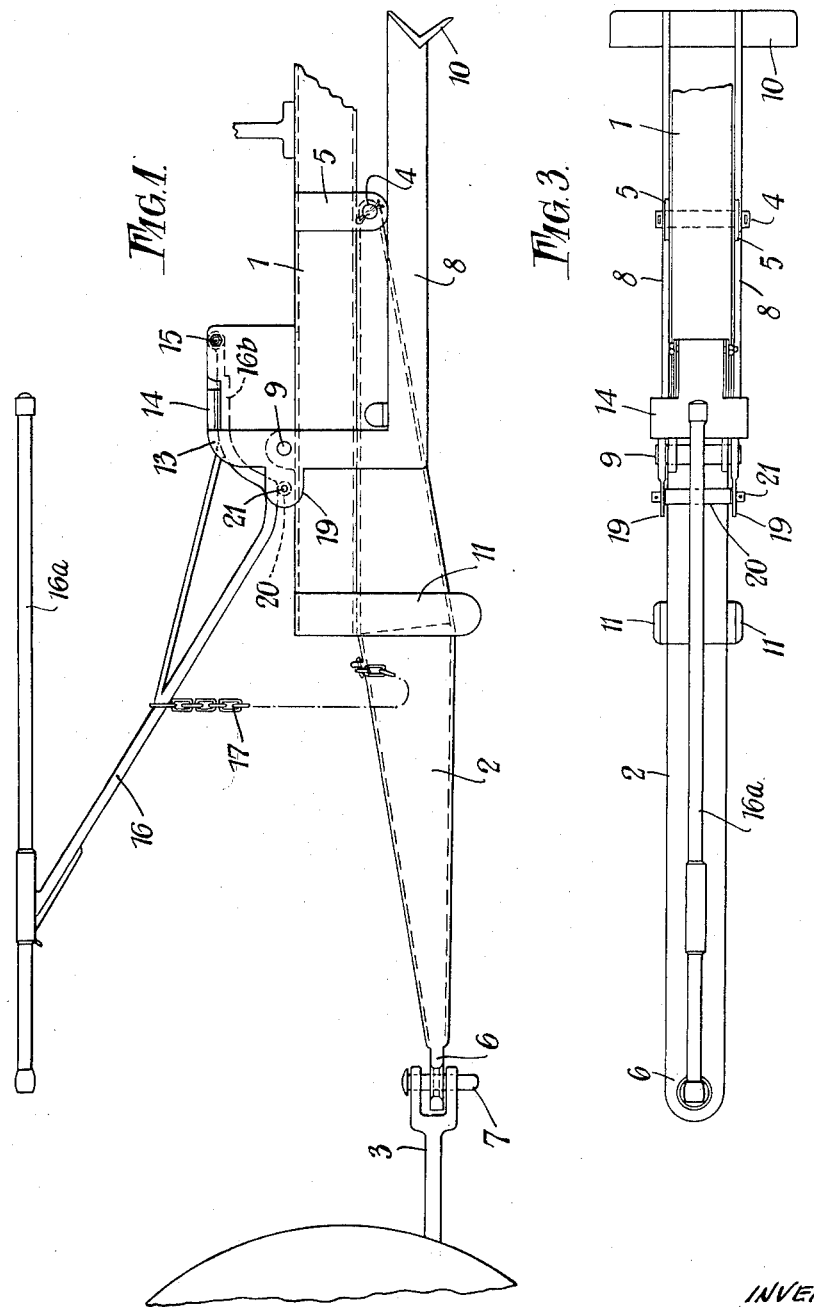
INVENTOR
JOSIAH W. TOMKINS

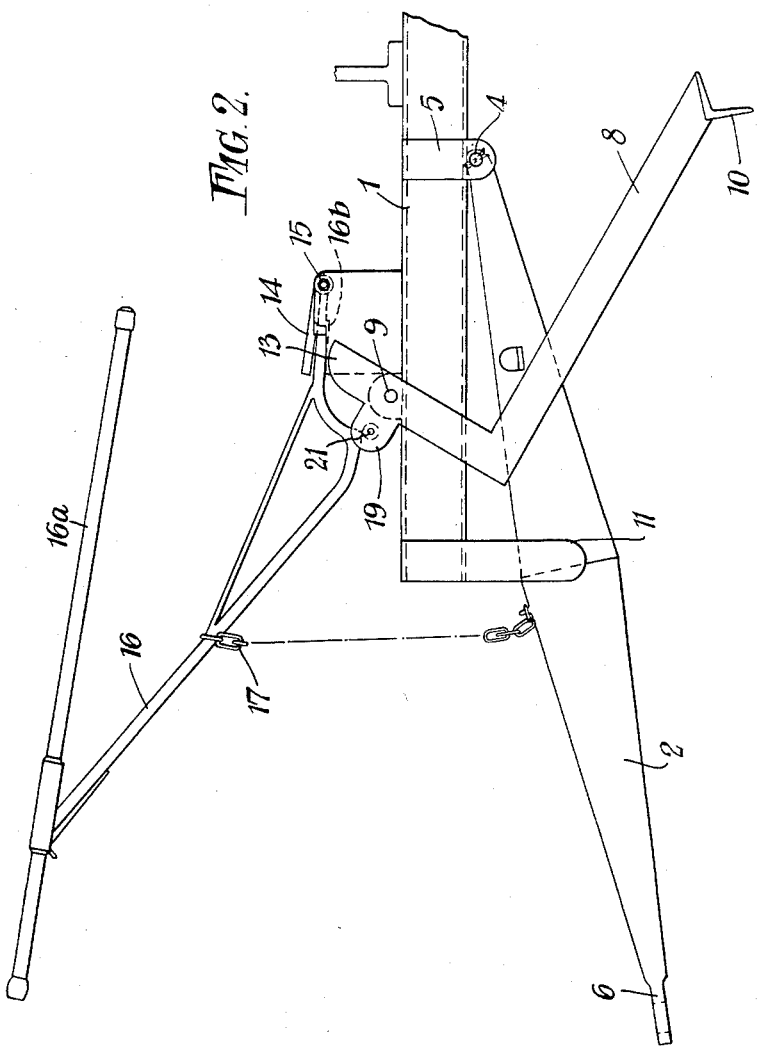

United States Patent Office 2,933,332
Patented Apr. 19, 1960

2,933,332

TRAILER HITCHES

Josiah W. Tomkins, Apethorpe, Northants, England

Application December 3, 1956, Serial No. 626,032

Claims priority, application Great Britain
December 5, 1955

8 Claims. (Cl. 280—475)

This invention relates to trailers of the kind having a single axle with single or multiple wheels and arranged to transmit a substantial proportion of their vertical load to the drawbar of a towing vehicle, for example a tractor.

When such trailers are disconnected from a towing vehicle it is necessary to support their forward ends and it has been usual practice to provide a screw jack or jacks for this purpose. These jacks are slow to operate and unreliable in use especially under the conditions of agricultural employment. It is also found that variations in height between the drawbars of various tractors necessitates an adjustment of the height of the forward ends of the trailers before they can be coupled to a tractor.

It is the object of the invention to provide a drawbar assembly for a trailer which obviates the necessity for manual operation of a jack or the like when it is desired to disconnect it from its towing vehicle and to provide a considerable degree of height adjustment in the drawbar connecting link.

According to the invention a drawbar for trailers has a fore and aft member rigidly attached to the chassis of a trailer, a strut member adapted to contact the ground pivoted to the fore and aft member about a substantially horizontal axis and an attachment link pivoted about a parallel axis, the forward end of said link being vertically adjustable and said link having a position where it supports said fore and aft member, latch means to lock the strut in a position clear of the ground when the fore and aft member is supported by the attachment link, and means carried by an operating arm within the reach of the tractor driver to release said latch on upward movement thereof to permit said strut to fall into contact with the ground and to raise said strut clear of the ground on a downward movement to a latched position.

In a preferred form of the invention the strut member is of inverted L shape and is maintained erect by the contact of the longer arm thereof with a lug fixed to the fore and aft member.

In this form a bracket carrying a roller is fixed to the shorter arm of the strut and is contacted by a portion of the operating lever near its pivot to apply a rotary movement to the strut to raise it to the position where it is locked clear of the ground.

The strut is made of such length in relation to the height of its pivot from the ground, when in normal towing position, that when its foot (which is preferably fitted with a substantial angle iron base) is in contact with the ground, it lies at such angle that on a backward or forward movement of the trailer as the case may be it is erected to a vertical position as its upper end is moved relatively to its foot.

It is preferred that the arrangement of the strut is such that a rearward movement of the trailer erects it to the vertical supporting position, while a forward movement of the trailer causes the strut to collapse.

The above and other parts of the invention are embodied in one constructional form of drawbar attachment device for a trailer which will now be described in some detail by way of example with reference to the accompanying drawings in which:

Fig. 1 is a side elevation which shows part of a tractor and the draw bar connection of a two-wheel trailer attached thereto in towing relationship, Fig. 2 is a side elevational view of the parts in the position adopted when a strut member is being erected, Fig. 3 is a plan view of the hitch shown in Fig. 1.

A single axle trailer having wheels located towards its rear end (of conventional form and not shown) has a forwardly projecting member or beam 1 rigidly attached to its chassis.

An attachment link 2 for connecting the beam 1 to the towbar 3 of a tractor is pivoted about a horizontal pin 4 carried transversely in downwardly depending lugs 5 fixed to the beam.

The attachment link has a lug 6 drilled to receive a connecting pin 7 at its outer end which projects some distance beyond the end of the beam 1.

A pair of cranked levers, constituting a strut member 8, is secured to a second horizontal pin 9 parallel to that carrying the attachment link 2 and this pin is pivotally mounted in a pair of lugs upstanding from the beam 1. The cranked levers are joined together at their outer ends by a stout angle iron foot 10 welded between them transversely with its flanges extending outwardly. The edge of one flange of the angle iron is aligned with the rearward edges of the levers while the other flange extends forwardly of their forward edges. This arrangement of the foot permits both its flanges to contact the ground, when the strut is erected.

An abutment plate or block 11 fixed to the beam of the trailer is arranged to prevent downward pivotal movement of the strut beyond a position where its longer limb is substantially vertical and a bolt or latch device (not shown) may be provided between the block 11 and the struct 8 to maintain the strut in that position.

The shorter limbs of the cranked levers 8 are formed with ears 13 extending beyond the pin 9 and these ears form one member of a latch device.

A co-operating lug 14 forming the second member of the latch device is pivotally mounted on a third pin 15 arranged parallel to those above mentioned. This lug rests upon and is rotatable by means of an operating arm or hand lever 16, 16a which is also mounted on pin 15 and is extended forwardly into the reach of the driver of the towing tractor.

The length of the longer limb of the strut 8 is such that when the foot 10 contacts the ground from a normal towing position of the beam it lies at angle of some 20° or 30° to 80° to the horizontal with a forward slope from the foot.

A chain 17 is provided connecting the handle 16 to the link 2, so that the link can be adjusted for height from the tractor seat when not connected to the towbar 3.

The latch 14 is weighted so that it normally assumes the position, shown in Fig. 1, substantially parallel to the beam 1, and it rests upon the portion 16b of the operating arm 16.

A pair of lugs 19, protruding from the shorter limbs of the strut 8, carrying a roller 20 upon a pin 21.

This roller is free to run around an arcuately formed part of the portion 16b of the operating arm 16 when the arm is raised to release the latch 14 from contact with the ears 13 on the strut 8 when that strut is in the housed position shown in Fig. 1.

The improved drawbar attachment device operates in the following manner:

Assume that the trailer is being towed as shown in Fig. 1, then the upper face of the attachment link 2, is hard up against the underside of the beam 1 and a substantial proportion of the trailer vertical load is being transmitted to the tractor road wheels through the usual yoke and lug connection on the towbar 3, and the strut 8 lies with its longer limb beneath and parallel to the beam, where it is maintained by interengagement of the two lugs 13 and 14 constituting the latch.

Now assume that it is desired to detach the trailer from the tractor and leave it supported on the strut; the tractor driver releases the latch 13, 14 by upward operation of the handle 16 (within his reach) while the tractor is stationary. The strut then pivots downward about its upper end under gravity and the angle iron constituting its foot 10 contacts the ground (Fig. 2). The strut now lies at a forward slope relative to its point of contact with the ground.

The tractor driver now slowly backs the tractor and trailer, thereby causing the foot of the strut to bite into the ground and thereafter to pivot rearwardly about its lower end.

This movement causes a slight lifting movement of the whole forward end of the trailer as the strut 8 comes to a position where its longer limb is substantially vertical.

As the strut assumes this position it takes the weight of the forward end of the trailer and the attachment link 2 (now slightly downwardly inclined) may be easily detached from the tractor towbar by removing the pin 7.

When it is desired to move the trailer away again it is only necessary to back up a tractor until the yoke in its draw-bar is in longitudinal alignment with the lug 6 of the attachment link. The latter can be lifted by the handle 16 and chain 17 to the appropriate height for engagement by the connecting pin 7, whereafter a forward movement of the tractor causes the collapse of the strut 8 and take over of the forward downward load of the trailer by the tractor drawbar through the attachment link 2.

At this stage the strut 8 is in the trailing position shown in Fig. 2, and in order to return it to the housed position shown in Fig. 1 it is only necessary for the driver to depress the operating lever 16, 16a. Downward movement of the lever 16, 16a applies a turning moment to the strut 8 through the roller 20, and, when the strut is thus shifted back to the position shown in Fig. 1, the latch 14 drops by gravity to re-engage the ears 13.

I claim:

1. A hitch structure comprising a trailer frame portion, a strut pivoted to said frame portion about a substantially horizontal axis and swingable between a generally horizontal storage position clear of the ground and a generally vertical ground engaging position for supporting said frame portion, a tow link pivoted to one end to said frame portion about a substantially horizontal axis, said link extending forwardly of said frame portion from its pivotal connection and the forward end thereof being vertically adjustable and having hitch means for coupling to a tractor, the pivotal connection between said link and frame portion being spaced rearwardly of the leading edge of said frame portion and said link underlying a part of said frame portion to support said frame portion when said strut is out of supporting position, the pivotal connection between said strut and said frame portion being adjacent one end of said strut with said strut being free to gravitate to ground engaging position, latch means on said structure and releasably engageable with said strut to lock said strut in storage position, and an operating arm pivotally mounted on said structure and swingable in one direction to move said latch to release said strut and in the other direction to move said strut to latched storage position, said strut member being of L shape and pivoted to said frame portion adjacent the free end of its shorter arm, a stop on said frame portion and engageable by the longer arm of said strut when in vertical position, and cam means on said shorter strut arm, and cam means on said operating arm and cooperative with said strut cam means to raise said strut to locked position.

2. A trailer hitch structure comprising a trailer frame portion, a strut pivoted to said frame portion and swingable between a storage position clear of the ground and a ground engaging position for supporting said frame portion, a tow link pivoted at one end to said frame portion, hitch means on said link for coupling to a tractor, said strut being free to gravitate to ground engaging position, latch means on said structure and releasably engageable with said strut to lock said strut in storage position, and an operating arm pivotally mounted on said structure and swingable to move said latch to release said strut, and cooperable elements on said strut and said operating arm forming cam means for raising said strut into storage position upon downward movement of said operating arm.

3. A hitch structure according to claim 2 wherein said latch is mounted to gravitate to locking position and is weighted to accelerate gravity movement.

4. A hitch structure according to claim 2 wherein said operating arm extends forwardly and is of a length to be within reach of the driver of a tow tractor while in the driver's position, and means connecting said link with said operating arm whereby said link is adjustable about its pivot by movement of said arm.

5. A trailer hitch structure according to claim 2 wherein said latch means includes an ear extending from said strut, and a lug pivoted to the frame portion and normally disposed by the force of gravity in a generally horizontal plane abutting an edge of said ear to lock the strut in the storage position, said operating arm having a portion disposed below said lug so that upward movement of said arm raises the lug and the strut is freed to move into the ground engaging position by gravity.

6. A hitch structure according to claim 5 comprising cooperable elements on said strut and said operating arm forming cam means for raising said strut into storage position upon downward movement of said operating arm, said arm extending forwardly and being of a length to be within reach of the driver of a tow tractor while in the driver's position, and means connecting said link with said operating arm to adjust the link about its pivot by movement of said arm, whereby said arm controls the position of said strut and said link.

7. A trailer hitch structure comprising a trailer frame portion, a strut pivoted to said frame portion and swingable between a storage position clear of the ground and a ground engaging position for supporting said frame portion, a tow link pivoted at one end to said frame portion, said link extending forwardly of said frame portion from its pivotal connection and the forward end thereof and having hitch means for coupling to a tractor, the pivotal connection between said link and frame portion being spaced rearwardly of the leading edge of said frame portion and said link underlying a part of said frame portion to support said frame portion when said strut is out of supporting position, the pivotal connection between said strut and said frame portion being adjacent one end of said strut with said strut being free to gravitate to ground engaging position, latch means on said structure and releasably engageable with said strut to lock said strut in storage position, and an operating arm pivotally mounted on said structure and swingable to move said latch to release said strut, and cooperable elements on said strut and said operating arm forming cam means for raising said strut into storage position upon downward movement of said operating arm.

8. A hitch structure according to claim 7 comprising a lug projecting from said strut in alignment with the pivotal connection between said strut and said frame portion; said cam means including a curved projecting portion on said operating arm, and a roller mounted on said lug and engaging said curved projecting portion.

References Cited in the file of this patent

UNITED STATES PATENTS

| | | |
|---|---|---|
| 2,256,310 | Braley et al. | Sept. 16, 1941 |
| 2,400,145 | Zink et al. | May 14, 1946 |
| 2,528,461 | Walters | Oct. 31, 1950 |
| 2,580,545 | Hill | Jan. 1, 1952 |
| 2,621,940 | Gorham | Dec. 16, 1952 |

FOREIGN PATENTS

| | | |
|---|---|---|
| 596,542 | Great Britain | Jan. 6, 1948 |
| 761,292 | Great Britain | Nov. 14, 1956 |
| 21,406 | France | Sept. 13, 1920 |